July 27, 1948.　　　　　T. O. HOPPES　　　　　2,445,947
COMBINED TIRE CHAIN APPLICATOR AND MUD LUG
Filed Dec. 1, 1947　　　　　　　　　　　　　2 Sheets-Sheet 1
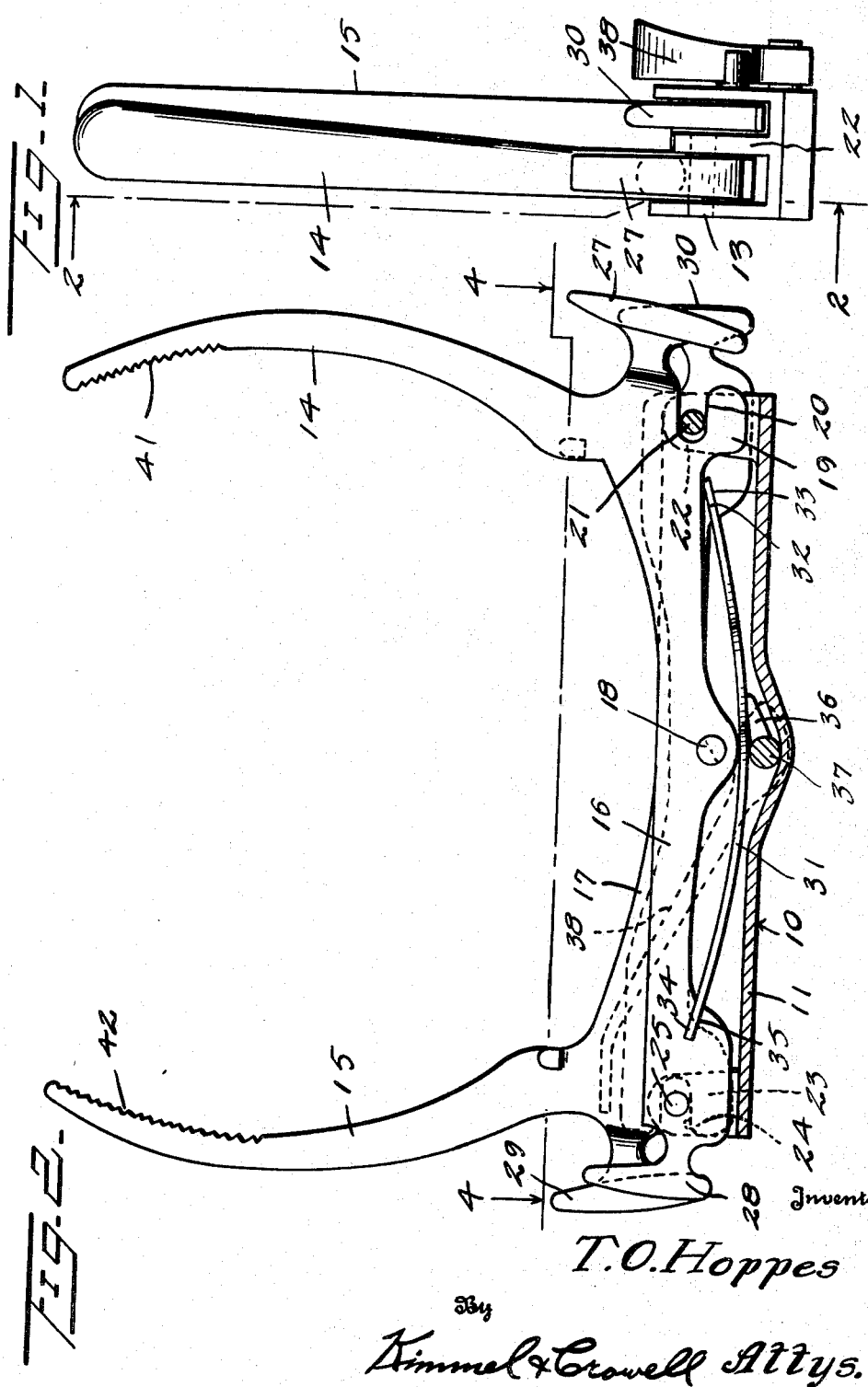
Inventor
T. O. Hoppes
By
Kimmel & Crowell Attys.

July 27, 1948.  T. O. HOPPES  2,445,947
COMBINED TIRE CHAIN APPLICATOR AND MUD LUG
Filed Dec. 1, 1947  2 Sheets-Sheet 2
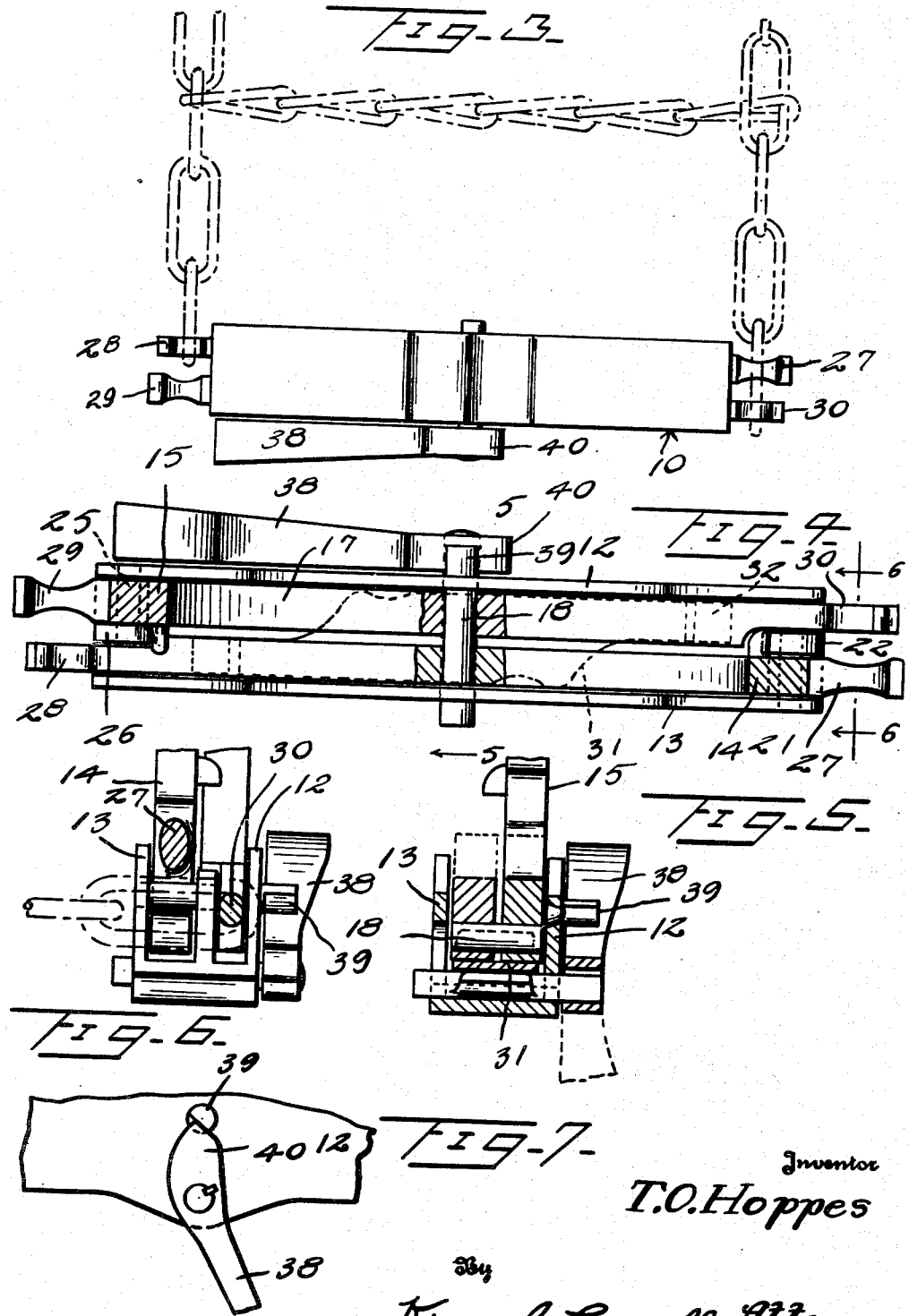
Inventor
T. O. Hoppes
By
Kimmel & Crowell Attys.

Patented July 27, 1948

2,445,947

UNITED STATES PATENT OFFICE 2,445,947

COMBINED TIRE CHAIN APPLICATOR AND MUD LUG

Thomas O. Hoppes, Tamaqua, Pa.

Application December 1, 1947, Serial No. 789,086

4 Claims. (Cl. 152—225)

This invention relates to a combined anti-skid chain applicator and mud lug for vehicle tires.

In the mounting of tire chains on a tire, various means more or less complicated have been devised for mounting the chains on the tires. It is an object of this invention to provide a simple device which can be quickly coupled to one end of each side chain, and can then be clamped onto the tire so that the open chain will be wrapped about the tire upon one revolution of the wheel, whereupon the applicator may be easily uncoupled and removed from the tire, and the ends of the chain connected together in a conventional manner.

Another object of this invention is to provide a device of this kind which may serve the dual purpose of assisting in mounting the tire chain, and also in forming a mud, snow or sand lug for obtaining traction in soft material.

A further object of this invention is to provide a device of this kind which includes a pair of spring-pressed arcuate clamping jaws pivotally secured together and loosely secured to a cap or tread element with the latter including a releasing bolt for releasably holding the jaws in released position.

With the above and other objects in view, my invention consists in the arrangement, combination and details of construction disclosed in the drawings and specification, and then more particularly pointed out in the appended claims.

In the drawings,

Figure 1 is a detail end elevation of a combined anti-skid chain applicator and mud lug for vehicle tires, Figure 2 is a sectional view taken on the line 2—2 of Figure 1, Figure 3 is a plan view of the device, showing in dot and dash lines the manner of applying a chain to a tire, Figure 4 is a sectional view taken on the line 4—4 of Figure 2, Figure 5 is a sectional view taken substantially on the line 5—5 of Figure 4, Figure 6 is a sectional view taken substantially on the line 6—6 of Figure 4, Figure 7 is a fragmentary side elevation showing the releasing lever in released position.

Referring to the drawings, the numeral 10 designates generally an elongated lug forming member which is of U-shape in transverse section and includes a bight 11 and parallel legs or side members 12 and 13. The body 10 has rockably mounted therein a pair of longitudinally arcuate clamping members 14 and 15 which include elongated outer levers 16 and 17 respectively.

The levers 16 and 17 are pivotally connected together by means of a pivot member 18 which is disposed in substantially the medial point of the length of the body 10. The junction between the jaw 14 and the lever or arm 16 includes an offset lug 19 formed with a notch 20 within which a pin 21 is secured between an ear 22 and the side member 13. The jaw member 15, with the lever 17 includes an offset lug 23 similar to lug 19 and formed with a notch 24 within which a pin 25 loosely engages.

The pin 25 is secured between an inner ear 26 and the side member 12 of the body 10. The outer end of the jaw 14 at the junction between this jaw and the lever 16 is formed with a T-shaped chain engaging member 27, and the end of the lever 16 is formed with a second T-shaped chain engaging member 28. The jaw member 15 at the junction between this jaw and the lever 17 is formed with a T-shaped chain engaging member 29 disposed in parallel relation to chain engaging member or lug 28, and the end of the lever 17 is formed with a T-shaped chain engaging member 30 disposed in parallel relation to lug or chain engaging member 27.

The jaws 14 are constantly urged to clamping position by means of a bowed spring 31 which is formed with one offset end 32 which engages in a slot 33 formed in the adjacent end of the lever or arm 17. The spring 31 also includes a second offset end 34 which engages in the slot 35 formed in the adjacent end of the lever or arm 16. The spring 31 is bent over the central portions of levers 16 and 17 and in order to move the jaws 14 and 15 to released position, I have provided a cam 36 which is carried by a cam shaft 37 having a handle or lever 38 secured thereto.

The handle or lever 38 is disposed outside of the side member 12 of body 10 and a stop pin 39 is secured to the side 12 and is engageable by the projecting end 40 of the lever handle 38.

When the projecting end 40 of handle 38 engages stop member 39, cam 36 will be in its jaw releasing position and will be in substantial alignment with pivot member 18. The jaw 14 at its inner end is preferably formed with teeth or serrations 41 for engagement with the side wall of a tire, and jaw 15 is also formed at its inner end with teeth or serrations 42.

In the use and operation of this device when it is desired to apply a chain to a tire, one end of the chain may be engaged as shown in Figure 3, with lug 28, and the adjacent end of the chain engaged with lug 30. In engaging the chain with lug 30 the end link of the chain is also engaged over lug 27. Lever 38 is rocked to released position to move the jaws 14 and 15 outwardly whereupon the device is applied to the tire with the body 10 engaging over the tire tread. Lever 38 is then rocked to released position where this lever will be disposed alongside of body 10. Jaws 14 and 15 will then be moved to clamping position by spring 31. The wheel may then be turned for one revolution so that the chain will be moved around the tire, whereupon lever 38 is then moved to released position and the device disengaged from the chain.

Where it is desired to use this device as a mud or snow lug in an emergency, the device is clamped by itself upon the tire and the body 10 will provide the traction means for the tire.

I do not mean to confine myself to the exact details of construction herein disclosed, but claim all variations falling within the purview of the appended claims.

What I claim is:

1. A combined chain applicator and tire lug comprising a pair of tire clamping jaws, oppositely extending lever arms carried by said jaws, pivot means securing said arms together between the ends thereof, a hook carried by the free end of each arm, an inverted transversely U-shaped combined cover and traction lug engaging over said arms, a loose coupling between said combined cover and traction lug and the upper ends of said jaws, and a spring constantly urging said jaws to clamping position.

2. A combined chain applicator and tire lug comprising a pair of tire clamping jaws, oppositely extending lever arms carried by said jaws, pivot means securing said arms together between the ends thereof, a hook carried by the free end of each arm, a second hook at the junction between each arm and jaw and disposed in spaced relation with respect to said first hook, an inverted transversely U-shaped combined cover and traction lug engaging over said arms, a loose coupling between said combined cover and traction lug and the upper ends of said jaws, a spring connected between said arms for constantly urging said jaws to releasing position, and jaw release means carried by said combined cover and lug engageable with said arms for moving the latter to jaw releasing position.

3. A combined chain applicator and tire lug comprising a pair of tire clamping jaws, oppositely extending lever arms carried by said jaws, pivot means securing said arms together between the ends thereof, a hook carried by the free end of each arm, an inverted transversely U-shaped combined cover and traction lug engaging over said arms, a loose coupling between said combined cover and traction lug and the upper ends of said jaws, an elongated bowed spring connected between said arms for normally urging said jaws to clamping position, a releasing cam pivotally carried by said cover and lug disposed adjacent the pivotal connection between said arms, and an operating lever fixed relative to said cam.

4. A tire lug comprising a pair of clamping jaws engageable with the side walls of the tire, oppositely extending arms carried one by each jaw and adapted to extend over the tread of the tire, means pivotally securing said arms together, a spring means for holding said jaws in clamping position, and lever operated means for moving said jaws to released position.

THOMAS O. HOPPES.

REFERENCES CITED

The following references are of record in the file of this patent:

UNITED STATES PATENTS

| Number | Name | Date |
| --- | --- | --- |
| 1,266,507 | Ludwig | May 14, 1918 |
| 1,499,036 | Smith | June 24, 1924 |
| 2,076,894 | Johnson | Apr. 13, 1937 |